(12) United States Patent
Weskamp et al.

(10) Patent No.: US 11,357,222 B2
(45) Date of Patent: Jun. 14, 2022

(54) TOURNAMENT FISHING MEASUREMENT DEVICE AND METHOD

(71) Applicant: Ketch Products, Inc., East Dundee, IL (US)

(72) Inventors: Robert Weskamp, Barrington Hills, IL (US); Eric Peterson, Genoa, IL (US)

(73) Assignee: Ketch Products, Inc., East Dundee, IL (US)

( * ) Notice: Subject to any disclaimer, the term of this patent is extended or adjusted under 35 U.S.C. 154(b) by 603 days.

(21) Appl. No.: 16/352,357

(22) Filed: Mar. 13, 2019

(65) Prior Publication Data
US 2020/0288689 A1 Sep. 17, 2020

(51) Int. Cl.
*A01K 97/00* (2006.01)
*G01B 3/06* (2006.01)

(52) U.S. Cl.
CPC ............... *A01K 97/00* (2013.01); *G01B 3/06* (2013.01)

(58) Field of Classification Search
None
See application file for complete search history.

(56) References Cited

U.S. PATENT DOCUMENTS

| | | | | |
|---|---|---|---|---|
| 1,474,804 A | * | 11/1923 | Tyrrell | G01B 3/04 33/567 |
| 3,259,988 A | * | 7/1966 | Lunn | A01K 97/00 33/549 |
| 4,696,360 A | * | 9/1987 | Homen | G01G 17/08 177/262 |
| 4,839,675 A | * | 6/1989 | Owen | A01K 97/00 396/429 |
| 5,097,617 A | | 3/1992 | Craven | |
| 5,148,607 A | * | 9/1992 | Lasiter | A01K 97/00 206/315.11 |
| 5,339,532 A | * | 8/1994 | O'Keefe | A01K 97/00 33/485 |
| 5,526,575 A | * | 6/1996 | Hoover | A01K 97/00 33/485 |
| 5,637,838 A | * | 6/1997 | Arey | G01B 3/08 177/148 |
| 6,415,521 B1 | * | 7/2002 | Schnell | A01K 97/00 33/485 |
| 6,594,939 B2 | * | 7/2003 | Ondusko | A01K 97/00 33/464 |
| 6,765,155 B1 | * | 7/2004 | Gray | G01B 3/04 177/148 |
| 7,134,214 B1 | * | 11/2006 | Manning | B43L 7/00 33/483 |
| 7,191,536 B1 | * | 3/2007 | Bailey | A22C 25/04 33/485 |
| 7,605,332 B2 | * | 10/2009 | Winkler | A01K 97/08 177/25.13 |

(Continued)

FOREIGN PATENT DOCUMENTS

WO WO-2011022774 A1 * 3/2011 ............... G01B 3/42

*Primary Examiner* — Christopher W Fulton

(57) ABSTRACT

A fish measurement device including a hinged rigid bump board in combination with a slidably engageable cradle and a method for verification of fish measurement when using the device. The device having a QR tag used during the verification method authenticating fish size during a Catch, Photo, Release fishing tournament using a Tournament Management System.

14 Claims, 7 Drawing Sheets

(56) References Cited

U.S. PATENT DOCUMENTS

| | | | | |
|---|---|---|---|---|
| 8,141,262 | B1* | 3/2012 | Lee | G01B 3/1084 |
| | | | | 33/511 |
| 8,478,814 | B2* | 7/2013 | Shafter | G06F 17/40 |
| | | | | 709/203 |
| 9,185,895 | B1* | 11/2015 | Miatkowski | G01B 3/1004 |
| 9,928,611 | B2* | 3/2018 | Butterworth | G01B 11/02 |
| 10,598,474 | B1* | 3/2020 | Petrash | G01B 5/02 |
| 2005/0274032 | A1* | 12/2005 | Martin | A01K 61/90 |
| | | | | 33/511 |
| 2006/0005460 | A1* | 1/2006 | Bittrick | A01K 61/90 |
| | | | | 43/43.4 |
| 2011/0192046 | A1* | 8/2011 | Kinziger | A01K 97/20 |
| | | | | 33/759 |
| 2011/0208479 | A1* | 8/2011 | Chaves | A01K 97/00 |
| | | | | 702/187 |
| 2012/0324751 | A1 | 12/2012 | Wakeman | |
| 2017/0000099 | A1* | 1/2017 | Wanke | G01B 3/04 |
| 2018/0035655 | A1* | 2/2018 | Callingham | G01B 3/10 |

* cited by examiner

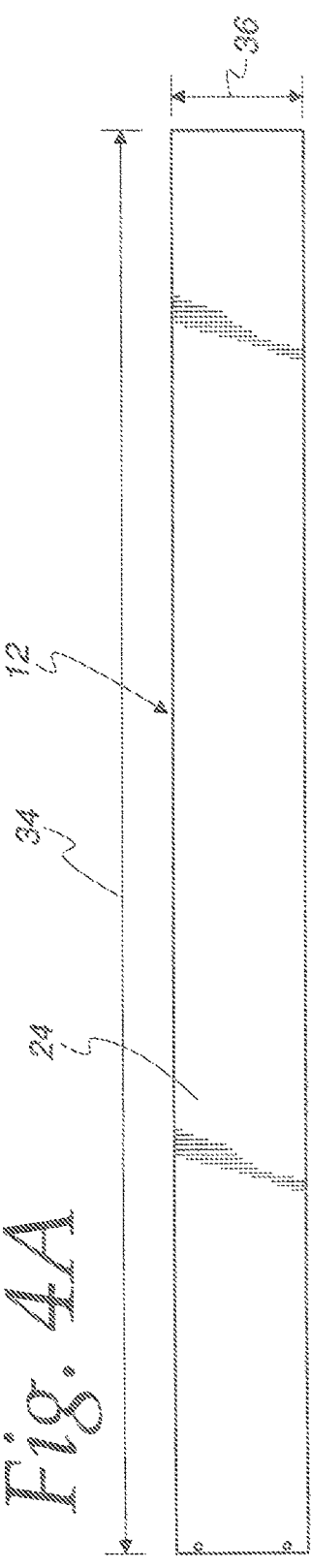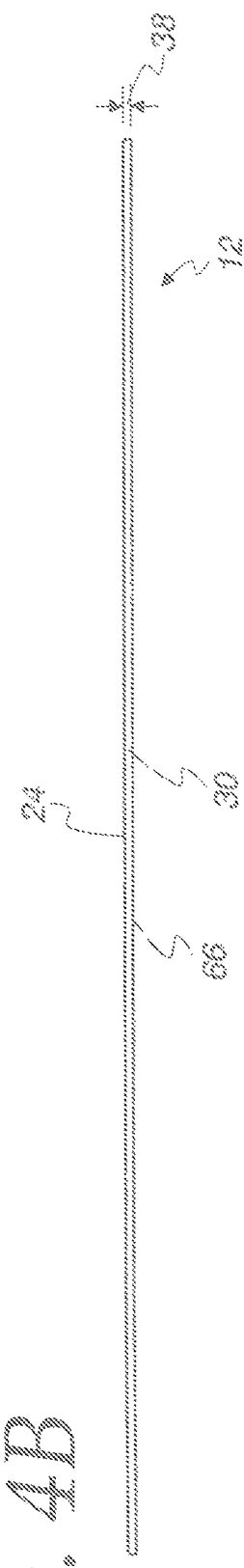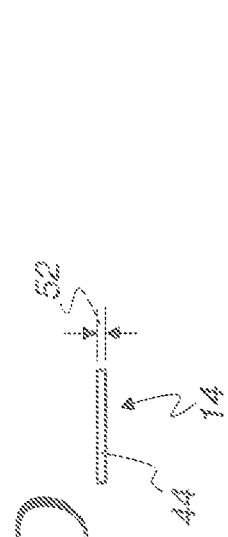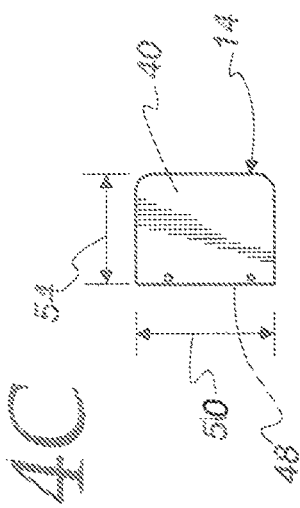

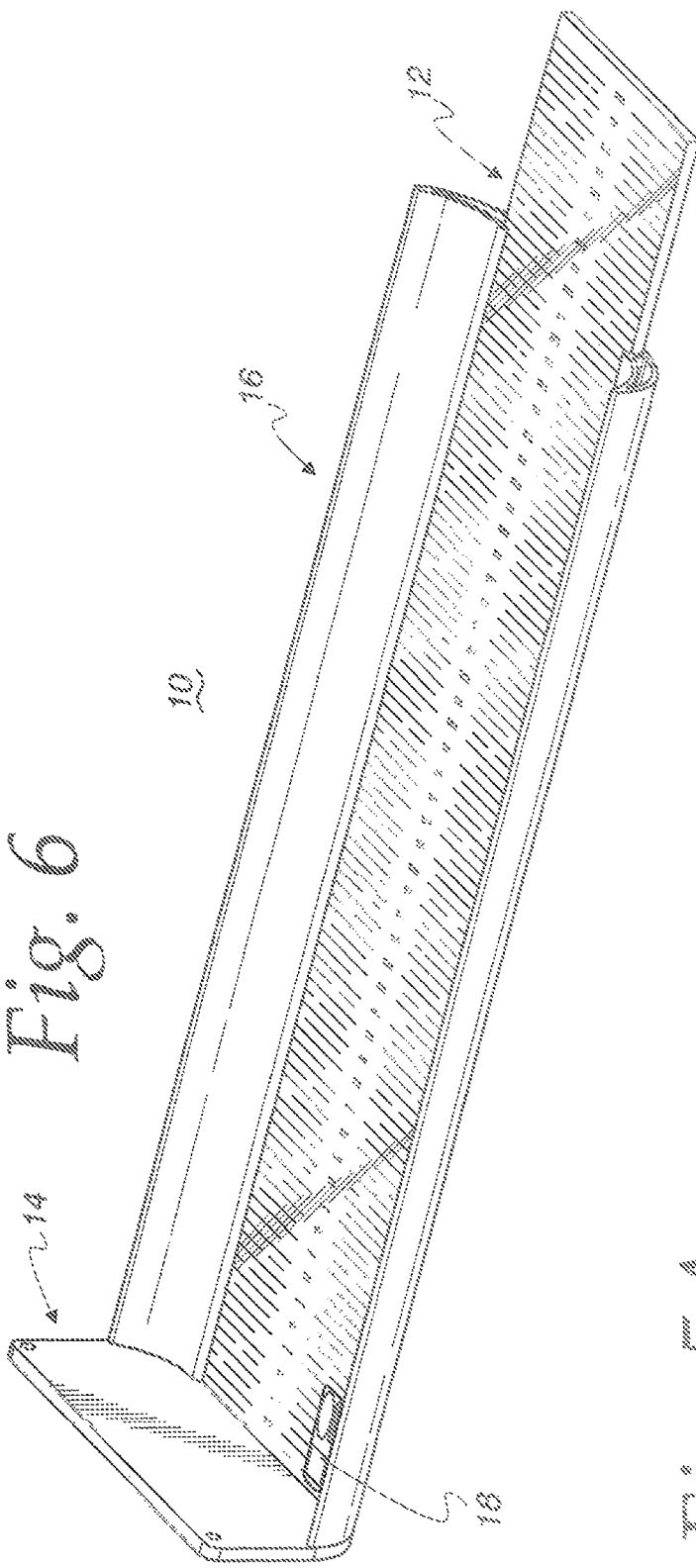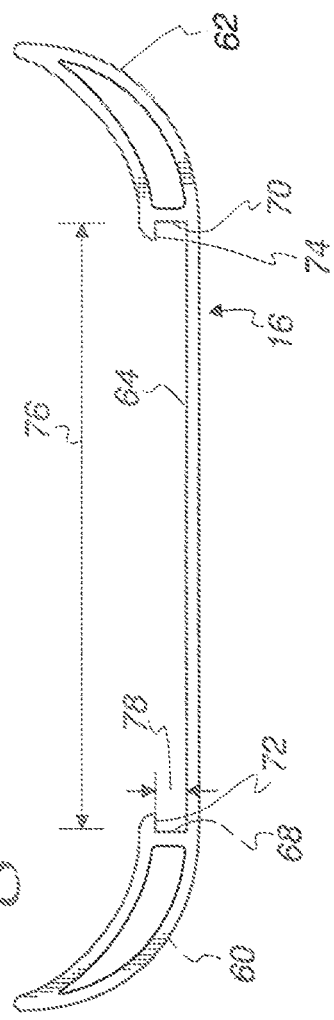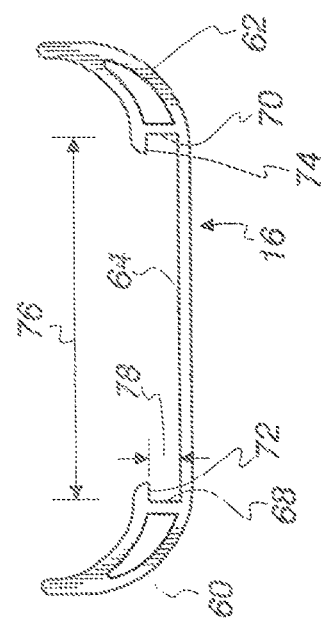

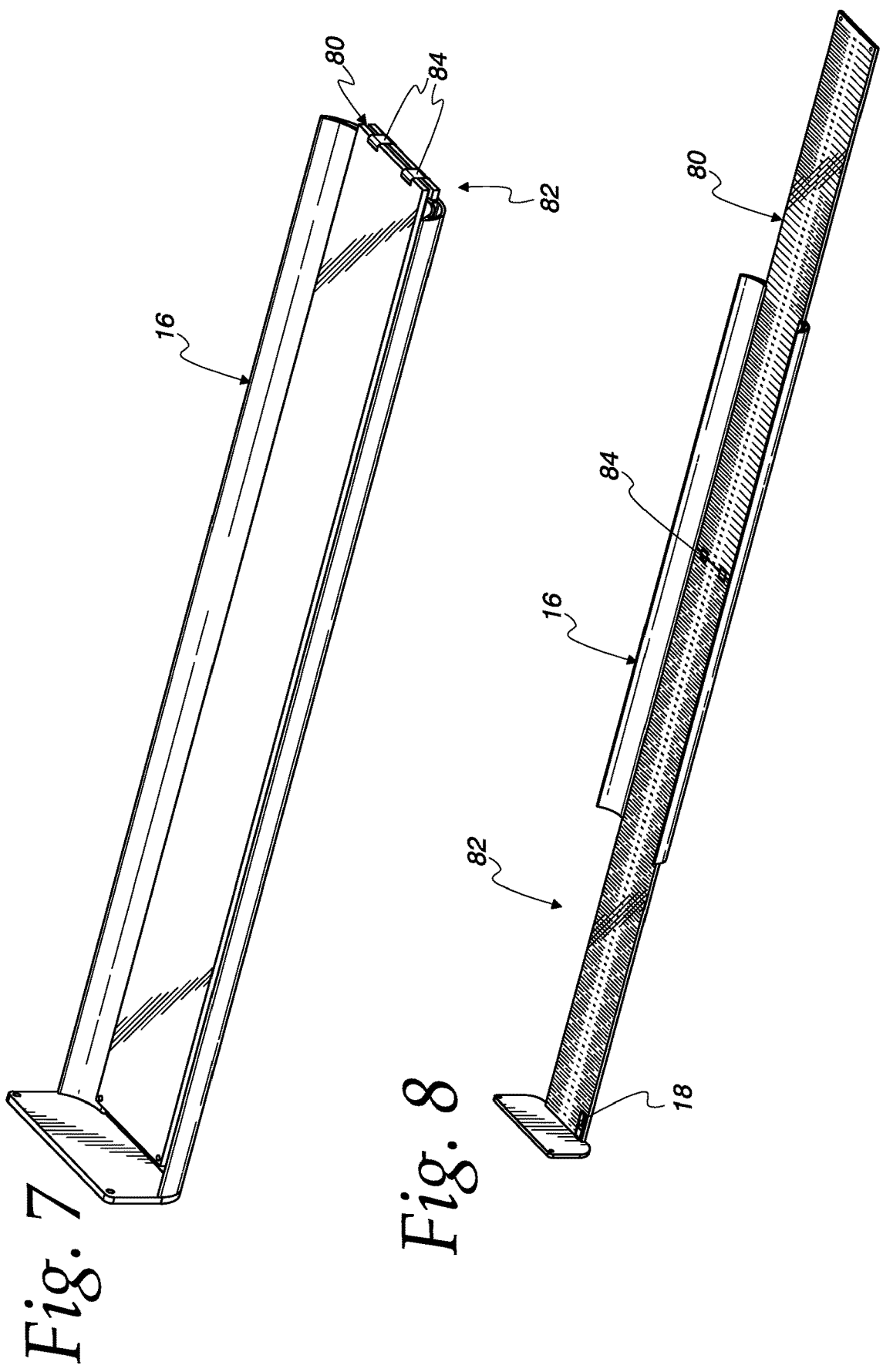

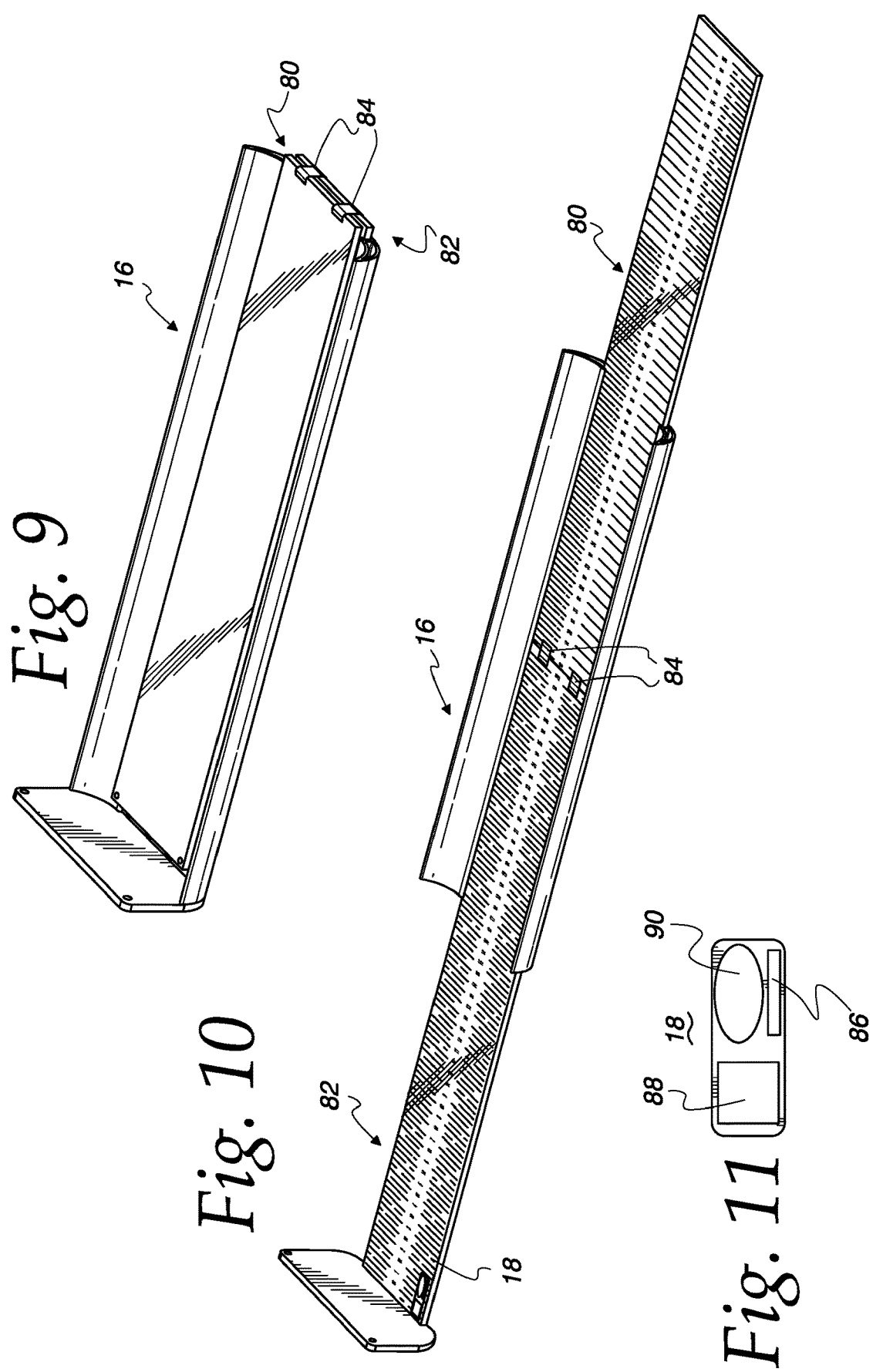

TOURNAMENT FISHING MEASUREMENT DEVICE AND METHOD

CROSS-REFERENCE TO RELATED APPLICATION

None.

BACKGROUND OF THE INVENTION

I. Field of the Invention

The present disclosure relates generally to devices and methods for measuring fish, and more specifically to a rigid bump board with a slidably engageable cradle and a method for verification of tournament fishing measurement.

II. Description of the Prior Art

The ability to accurately measure fish has numerous applications. Most common of which is being able to substantiate the fisherman's "story". A more substantial reason to obtain fish size is that many jurisdictions require fish of a certain species to be a minimum length to be kept, otherwise the fish must be returned to the water unharmed. Such minimum length regulations are particularly common for fresh water game fish such as walleye, northern pike, muskellunge, trout, bass, perch and the like. Furthermore, certain species also have an upper length limit to ensure the sustainability of the species. These upper and lower length specifications create a so-called "Slot Limit" for certain species of both fresh water and salt water species. Sport fishers therefor commonly need to measure the length of a caught fish to know whether the fish may be kept or must be returned to the water.

A further reason for accurate measurement of fish length, and one for which the present disclosure is well suited, is during fishing tournaments. Conventional bass tournaments, for example, require the angler to keep the fish in a so-called "live-well" in their boat until the day of fishing is over. At which time they are transported to a central weigh/measurement station, perhaps many hours after they have been caught. Fish mortality in these conventional bass tournament circuits are alarmingly high. Mishandling, oxygen deprivation, high water temperatures and high ammonia or carbon dioxide result in dead fish at the weigh-in scales. Many more die following their release due to oxygen debt, toxins in the bloodstream and infections. Indeed, total fish death at such tournaments approach the 50% rate.

In any event, common devices used for measuring the length of a caught fish include, for example, i) using a cloth, metallic or plastic measuring tape; ii) using a stick or other rigid elongate object having a distance measuring marks; iii) placing the fish in an elongate U-shaped half tube having a cap at one end and distance measuring marks inside the U-shaped portion extending away from the cap; and iv) using a so-called bump board. The present disclosure is a unique and novel advancement to bump boards.

Conventional bump boards are typically formed as an elongated rectangular substrate with ruled markings and include one or more bumps that project upwardly from the place of the elongated substrate. In use, the fish head-end is held firmly against the head bump and measurements of length are taken from the fish tail-end against the markings.

While prior art bump boards are widely considered the best devices to measure fish length, particularly during tournaments, they nevertheless have their shortcomings. For example, numerous designs are formed via some type of plastic and thus become brittle after limited use. Additionally, many bump boards are flexible and accordingly are susceptible to flexing and thus (purposeful) mismeasurements (i.e. cheating).

Even CPR tournaments have been susceptible to cheating techniques. By way of background, CPR stands for Catch, Photo, Release. In almost all CPR tournaments, length rather than weight is the basis for each competitor's catch. Essentially, a contestant catches a fish, lays it against an approved measuring board, and takes a photo using a digital camera or smart phone, etc. The photo is then uploaded to a server using a web browser, app or the like to a web-based Tournament Management System ("TMS"). Use of a smartphone captures time and geolocation information in the META data of each photo. The fish is then returned to the water, unharmed, after having been photographed. As handling and time out of water are minimized, the mortality rate for CPR tournaments are a fraction of conventional weight-based tournaments where fish are transported in live-wells, other holding tanks and even bags.

The TMS displays each event's photos on a website leader board. The number of fish per contestant can vary from one to five or more per day, depending on the event rules. As a contestant catches successive fish and photos are uploaded, photos of shorter fish are replaced so only the highest-scoring fish remain at the end. At the end of competition time, the cumulative length of bass (for example) for each contestant determines their ranking on the leader board. Unfortunately, it has been discovered that some anglers have been able to flex their board and/or use modified and/or imposter boards (i.e. cheat) during such CPR events.

The present disclosure overcomes the problems associated with the aforementioned conventional fish measuring devices and methods. Accordingly, it is a general object of this disclosure to provide an improved fishing measurement device and method.

It is another general object of the present disclosure to provide a rigid fish measuring device that prevents flexing and inaccurate measurements.

It is a more specific object of the present disclosure to provide a fish measuring device that includes extended and curved sides for support of larger fish.

It is another more specific object of the present disclosure to provide a hinged rigid fish measuring device with a cradle for accurate measurement of longer and larger fish.

It is yet another more specific object of the present disclosure to provide a fish measurement device and method that allows verification and authentication of every measurement.

These and other objects, features and advantages of this disclosure will be clearly understood through a consideration of the following detailed description.

SUMMARY OF THE INVENTION

According to an embodiment of the present disclosure, there is provided a device for measuring fish including a generally rectangular board with a front and back end and a top surface. The top surface includes ruled markings starting from the front end of the board. A bump is perpendicularly positioned at the zero mark of the board. An elongated cradle has sides for supporting a fish and is dimensioned for slidable engagement with the board.

According to another embodiment of the present disclosure, there is provided a device for measuring fish including a rectangular board hinged to form two halves and capable of folding upon one another in a collapsed state and opening to form an elongated board in the expanded state. The top surface of the board includes markings which start near one end which includes a perpendicularly positioned bump at the zero mark. An elongated cradle has sides for supporting a fish and is dimensioned for slidable engagement with both halves of the board.

According to another embodiment of the present disclosure, there is provided a method for measuring the length of a fish whereby the angler places the fish on a bump board with the nose of the fish touching the bump, takes a photograph of the fish that includes the board identification indicia, uploads the photograph to a server and verifies the authenticity of the photograph.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which:

FIG. 4A is a top plan view of the board component of the fish measuring device of FIG. 1.

FIG. 4B is a side view of the board component of the fish measuring device of FIG. 1.

FIG. 4C is a side view of the bump component of the fish measuring device of FIG. 1.

FIG. 4D is a top plan view of the bump component of the fish measuring device of FIG. 1.

FIG. 5A is a cross-sectional side view of the cradle component of the fish measuring device of FIG. 1.

FIG. 5B is a cross-sectional side view of the cradle component of the fish measuring device according to the principles of another embodiment of the present disclosure.

FIG. 6 is a perspective view of the fish measuring device according to the principles of another embodiment of the present disclosure.

FIG. 7 is a perspective view of the fish measuring device according to the principles of another embodiment of the present disclosure shown in a collapsed state.

FIG. 8 is a perspective view of the fish measuring device of FIG. 7 in an expanded state.

FIG. 9 is a perspective view of the fish measuring device according to the principles of another embodiment of the present disclosure shown in the collapsed state.

FIG. 10 is a perspective view of the fish measuring device of FIG. 9 in an expanded state.

FIG. 11 is a top plan view of a QR tag component of the fish measuring device and method according to the principles of the present disclosure.

DESCRIPTION OF THE PREFERRED EMBODIMENTS

One or more embodiments of the subject disclosure will now be described with the aid of numerous drawings. Unless otherwise indicated, use of specific terms will be understood to include multiple versions and forms thereof.

Figure 1:
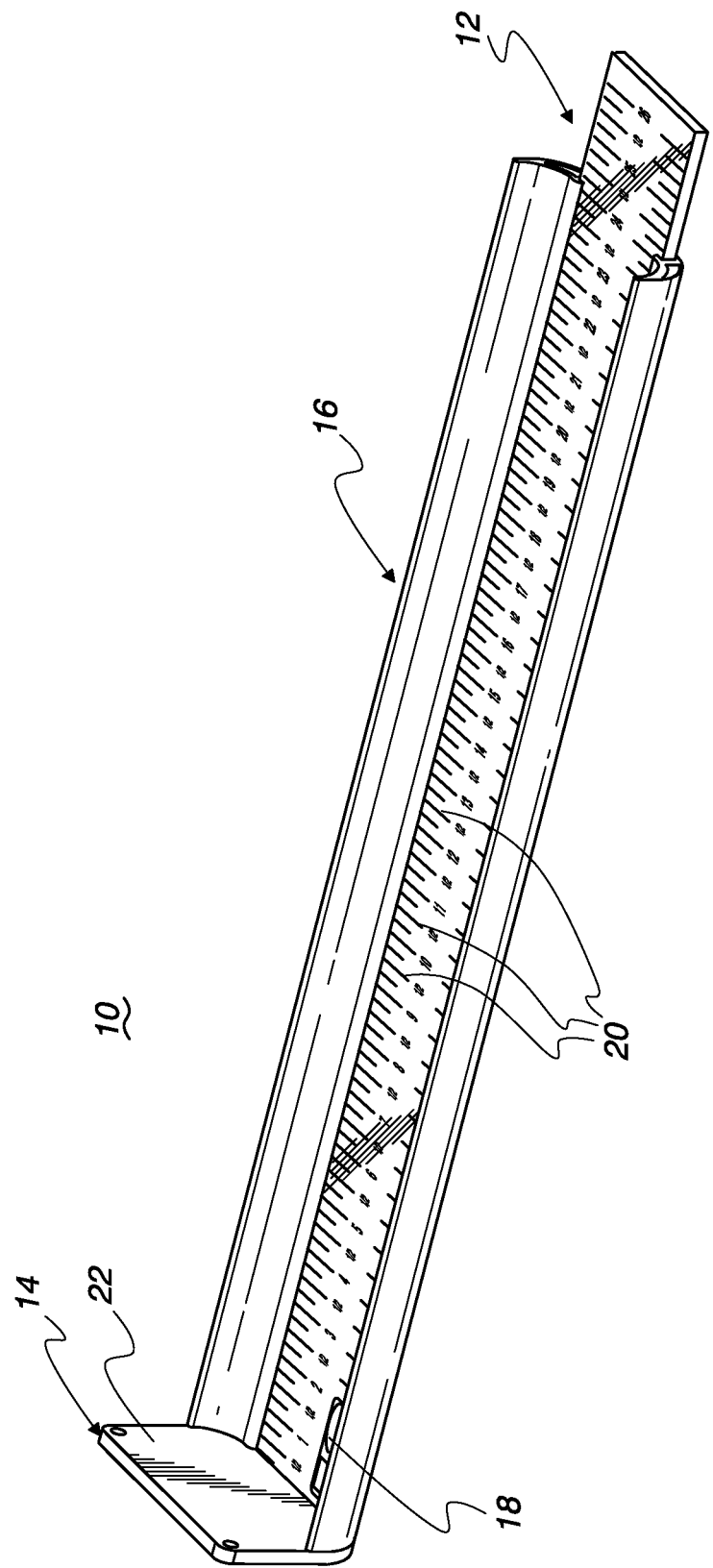
FIG. 1 is a perspective view of the fish measurement device according to the principles of an embodiment of the present disclosure.

Turning now to the figures, and in particular FIG. 1, an embodiment of the fish measuring device 10 is illustrated in the perspective view. The main component parts of the device 10 includes the elongated rectangular board 12, the bump or fence 14 and the curved side supports or cradle 16. The method of tournament fishing measurement further includes the QR tab 18 component.

The board 12 is rigid and preferably metallic, and in some embodiments aluminum in composition. The ruled markings 20 are similar to a ruler with preferably laser or machine engraved lines every 0.250", although it will be appreciated that the method and distance of such markings can be of any reasonable variety. The bump 14 stop is affixed to the board 12 with flush rivets, dowel pins, screws, or the like. It will also be appreciated that, so long as the face 22 of the bump aligns flush and perpendicular with the zero markings of the board, any suitable fastening means may be used.

Figure 2:
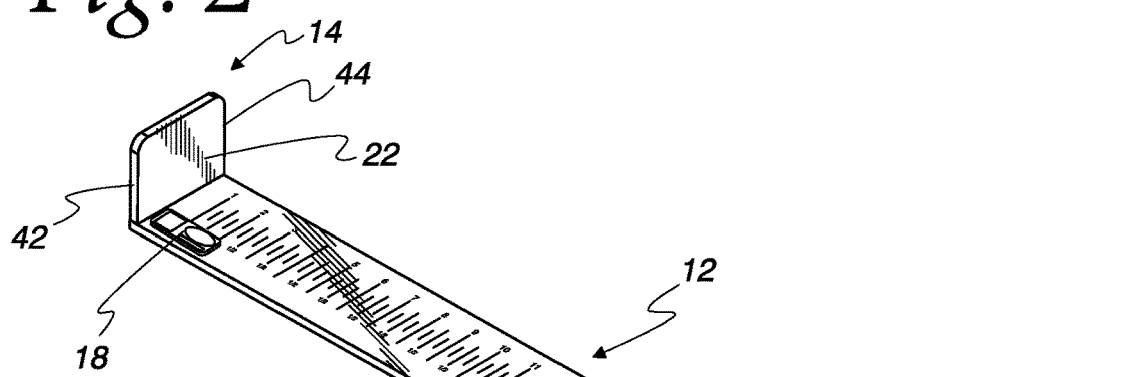
FIG. 2 is a perspective view of the board and bump components of the fish measuring device of FIG. 1.
Figure 3A:
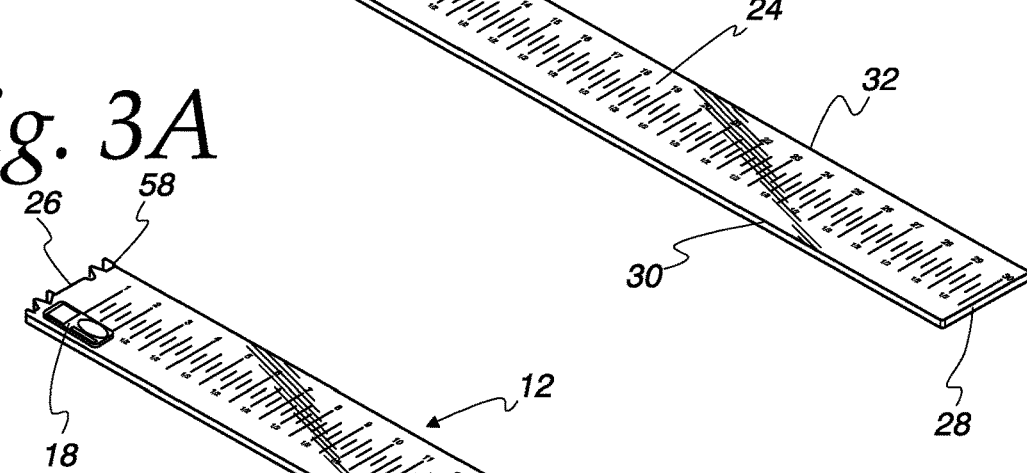
FIG. 3A is a perspective view of the board component of the fish measuring device of FIG. 1.
Figure 3B:
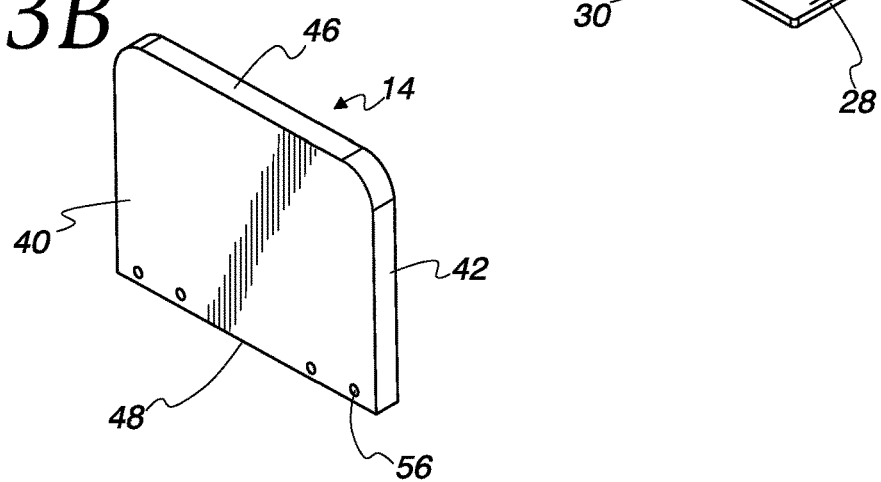
FIG. 3B is a reversed perspective view of the bump component of the fish measuring device of FIG. 1.

FIGS. 2-4 illustrate the generally rectangular board 12 and bump 14 component parts of the present disclosure. The board 12 having a top surface 24 whereby the markings 20 are machine engraved, laser etched, attached, inlaid or otherwise disposed, a front or bump end 26, a back or free end 28 and a left and right side (30, 32). The board further having a length 34, a width 36 and a height 38.

The bump 14 has a rear face 40 and a left and right side (42, 44), and a top 46 and a bottom 48. The bump further having a length 50, a width 52 and a height 54. The bump 14 may include fastener holes 56 to work in cooperation with the dowels 58 on the top surface 24 of the bump end 26 of the board 12 to fasten the bump 14 perpendicularly to the board 12. It will be appreciated that other means to couple the bump 14 perpendicularly to the board 12 may be used. It will further be appreciated that either the bump or the board or both may include an aperture or other means to fasten a lanyard or other tether to the boat or other floatable item of the angler.

The cradle component of FIG. 1 of the fish measuring device is shown in cross-sectional multiple embodiments of FIG. 5. The cradle 16 includes sloped side wings/supports to provide for gentler fish support and handling. Basically, FIG. 5B is a larger dimensional cradle component of that of FIG. 5A, and as such it is designed to be used with larger boards 12 to measure larger fish. In any event, the cradle 16 of FIG. 5 includes left and right sides (60, 62) and is dimensioned to frictionally engage an associated board 12. In particular, the top surface 64 of the cradle 16 contacts the bottom surface 66 of the board (see FIG. 4B), the left inside wall 68 of the cradle 16 contacts the left side of the board 12, the right inside wall 70 of the cradle 16 contacts the right side 32 of the board 12 and the bottom left and right inside flanges (72, 74) contact the top surface 24 of the board. Furthermore, the width 76 of the top surface 64 of the cradle 16 and the height 78 of the inside walls (68, 70) of the cradle 16 are dimensioned to fit the width 36 and height 38 of the board 12 respectively. As such, the board 12 and cradle 16 are frictionally and slidably engaged. It will be understood that this engagement may take other forms and designs (e.g. affixed, fastened, locked, adhered, biased, sprung, flanged, co-extruded, etc.) so long as the general engagement of the board and cradle is functional. Furthermore, in order to aid in fish measurement, the cradle 16 may extend to the last whole number measurement on the board 12.

It will be appreciated that the fishing measurement device of the present disclosure is not limited to a particular dimension. Indeed, FIG. 6 illustrates an alternate larger fish measuring device 10 including the board 12, the bump 14, and the cradle 16. It will further be appreciated that the QR tab 18 can be incorporated into any sized device.

Another alternate embodiment of the fish measuring device of the present disclosure is shown in FIGS. 7-8. This embodiment includes a hinged board consisting of two halves. FIG. 7 illustrates the folded/collapsed state with the second half 80 of the board resting on the first half 82, while FIG. 8 illustrates the unfolded/expanded state with the second half 80 extending the ruled markings of the first half 82. The two halves are coupled and capable of pivoting relative to one another through a set of hinges 84. This particular embodiment is useful for longer fish. Indeed, when the second half 80 is opened/unfolded the cradle 16 seamlessly frictionally engages the second half 80 and the first half 82 (and as previously discussed) at the same time locks the two halves in order to support the fish thereon.

As the larger dimensional embodiment of FIG. 6 relates to FIG. 1 so does the alternate embodiment of FIGS. 9-10 relate to FIGS. 7-8. Indeed, regardless of the dimensions, it is the slidably engageable cradle 16 in combination with the rigid hinged board that provides the unique usefulness of the fish measuring device. The curved sleeve (cradle) both holds/supports the fish and locks the linkage/hinge/fold to hold the board flat therebetween.

An enlarged view of the QR tag 18 component of the fish measuring device and method is shown in FIG. 11. In particular, the QR tag is a board identifier with indicia that includes a device serial number 86, a quick response code 88 and a manufacturer logo/trademark 90. This QR tag ensures that each fishing measurement device is individually serialized and embedded with a unique SQRC code. The code can be scanned at tournament check-in to ensure anglers are using an approved device, and can also be scanned through photographs to ensure that anglers are using the same board that was scanned at check-in. The SQSC tag has password protected information that can only be read by using an appropriate scanner. As such, they cannot be replicated. Quick response codes and their respective scanners and background processing are well known in the art and are incorporated herein. It is the unique process of using same within a photograph downloaded to server to authenticate the size of a catch fish that provides the novelty of the process. The dimension of the tag 18 is held to a precise measurement, (i.e. 2.000"), so that any fish photo can be scaled by using the length of the tag as a reference. This basically prevents anglers from modifying or creating counterfeit devices to make fish appear bigger than they really are. This essentially creates a fraud protection system that helps level the playing field for tournament participants.

Figure 12:
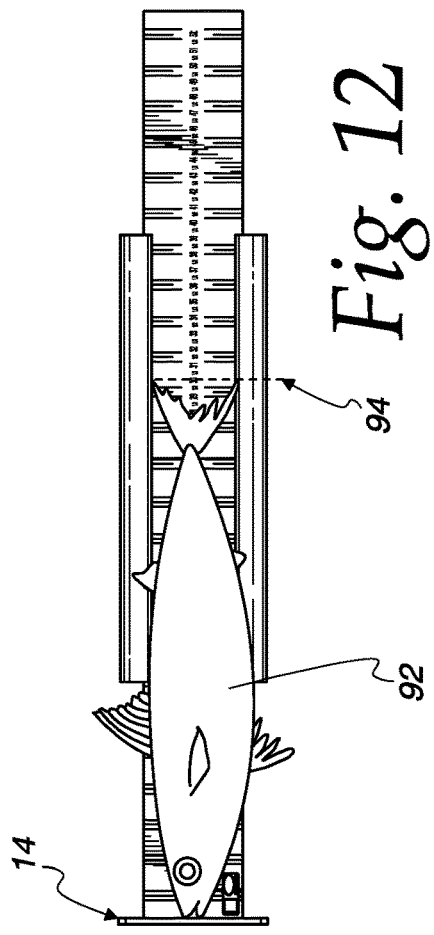
FIG. 12 is a top plan view of a fish being measured on the fish measuring device according to the principles of the present disclosure.
Figure 13:
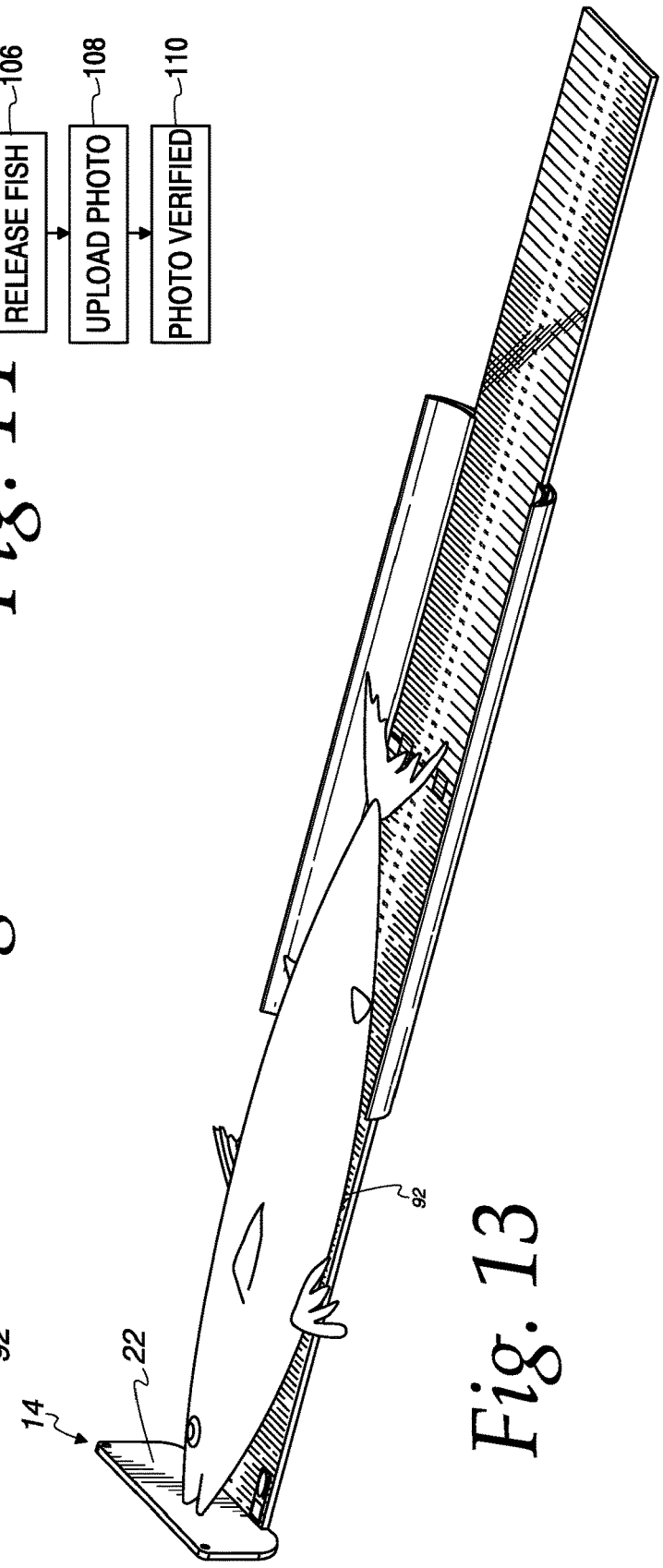
FIG. 13 is a perspective view of the fish and fish measuring device of FIG. 12.

FIGS. 12-13 illustrate the fish measuring device and method in use. In particular, the caught fish 92 is placed on the board with its head facing towards the bump. The fish 92 is then slid towards the bump until its closed mouth touches the face 22 of the bump. The length 94 of the fish 92 is then noted by the end of the tail fin against the ruled markings of the board.

Figure 14:
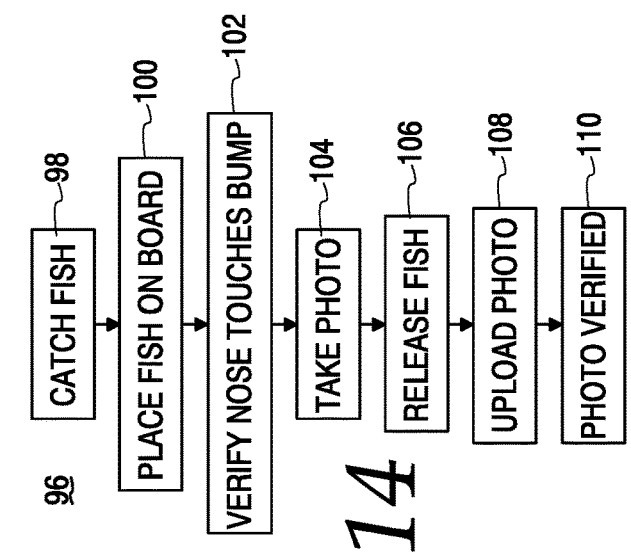
FIG. 14 is a simplified logic flow diagram of the fish measuring method according to the principles of the present disclosure.

The fish measurement method of the present disclosure will now be described relative to the logic flow of FIG. 14. This process incorporates a QR code and photo verification to authenticate the length of each catch. All boards are embedded with an asset tag containing a QR code unique to that particular board whereby each board is serialized and given its own unique QR code. After the angler and the board have gone through the check-in procedure the tournament fishing measurement process 96 begins with a caught fish 98. After removal of the hook, that fish is placed 100 on the fish measurement device 10 and the angler verifies 102 that the nose of the fish touches the bump face 22. The angler then notes the length of the fish by the end of the tail against the markings on the board and takes a photo 104. The angler verifies that the dimension of the fish is clearly in the photo, along with the tournament identifying badge. The fish is then released 106, the photo uploaded 108 to the TMS and is verified 110.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention in its broader aspects, and, therefore, the aim in the appended claims is to cover all such changes and modifications as fall within the true spirit and scope of the present disclosure.

What is claimed is:

1. A fish measuring device comprising:
 a rectangular shaped board having a front end, a back end, a left side, a right side, a bottom surface and a flat top surface;
 ruled markings disposed on said top surface of said board whereby said markings start near the front end;
 a bump having a front side, said bump positioned perpendicularly on said board whereby said front side aligns with said markings start; and
 an elongated cradle having sloped sides for supporting a fish, said cradle having a top surface, a left inside wall, a right inside wall and dimensioned for slidable engagement with said board whereby said left inside wall of said cradle contacts said left side of said board, said right inside wall of said cradle contacts said right side of said board, and top surface of said cradle contacts said bottom surface of said board.

2. The fish measuring device as defined in claim 1 wherein said board is hinged to form two halves capable of folding upon one another in a collapsed state and opening to form an elongated board in an expanded state.

3. The fish measuring device as defined in claim 2 wherein said cradle engages both of said halves.

4. The fish measuring device as defined in claim 1 wherein said markings are laser marked.

5. The fish measuring device as defined in claim 1 further including a board identification indicia disposed on said top surface of said board.

6. The fish measuring device as defined in claim 5 wherein said indicia is a QR code.

7. A fish measurement device comprising:
 a generally rectangularly shaped hinged board forming two halves capable of folding upon one another in a collapsed state and opening to form an elongated board in an expanded state, the board having a front end, a back end and a top surface;
 ruled markings disposed on said top surface of said board whereby said markings start near the front end;

a bump having a front side, said bump positioned perpendicularly on said board whereby said front side aligns with a zero marking; and an elongated cradle having sides for supporting a fish, said cradle dimensioned for slidable engagement of both halves of said board.

8. The fish measuring device as defined in claim 7 wherein said markings are laser marked.

9. The fish measuring device as defined in claim 7 further including a board identification indicia disposed on said top surface of said board.

10. The fish measuring device as defined in claim 9 wherein said indicia is a QR code.

11. A method for measuring the length of a fish comprising:

placing a fish on a rigid rectangular shaped bump board having a left side and a right side and further having ruled markings disposed on a top surface and dimensioned for slidable engagement with an elongated cradle having left and right inside walls and having sloped sides for supporting said fish and with an end of said fish touching the bump;

taking a photograph of said fish on said rigid bump board whereby said photograph includes said ruled markings and a board identification indicia;

uploading said photograph; and verifying the authenticity of said photograph and therefore a length of said fish via said ruled markings and said indicia on said rigid board.

12. The method for measuring the length of a fish as defined in claim 11 further including checking-in an angler and an associated bump board for participation in a tournament.

13. The method for measuring the length of a fish as defined in claim 11 further including releasing of said fish.

14. The method for measuring the length of a fish as defined in claim 11 further including scaling said photograph using a known tag dimension.

* * * * *